United States Patent
Carlson

[11] Patent Number: 5,927,851
[45] Date of Patent: Jul. 27, 1999

[54] VIBRATING DISPENSER AND METHOD FOR DISPENSING FILLED EPOXY ADHESIVES

[75] Inventor: Judith A. Carlson, Costa Mesa, Calif.

[73] Assignee: Raytheon Company, Lexington, Mass.

[21] Appl. No.: 08/833,420

[22] Filed: Apr. 7, 1997

[51] Int. Cl.[6] .................................................. B01F 11/02
[52] U.S. Cl. ......................................... 366/114; 366/110
[58] Field of Search ..................................... 366/108, 110, 366/111, 112, 114, 127, 197, 199, 209, 218, 154.1, 154.2; 604/82, 84; 222/196, 198

[56] References Cited

U.S. PATENT DOCUMENTS

| | | | |
|---|---|---|---|
| 1,444,540 | 2/1923 | Freedman | 366/111 |
| 2,088,304 | 7/1937 | Mizzy | 366/112 |
| 2,541,043 | 2/1951 | Curry | 366/108 |
| 2,779,510 | 1/1957 | Wilson et al. | 366/112 |
| 3,021,119 | 2/1962 | Van Der Burgt | 366/114 |
| 3,271,011 | 9/1966 | Rohm et al. | 366/108 |
| 3,433,276 | 3/1969 | Beadle et al. | 366/114 |
| 3,513,123 | 5/1970 | Saffir | 523/116 |
| 3,614,069 | 10/1971 | Murry | 366/108 |
| 3,946,829 | 3/1976 | Mori et al. | 366/114 |
| 4,433,916 | 2/1984 | Hall | 366/114 |
| 4,531,839 | 7/1985 | Cunisse et al. | 366/110 |
| 4,836,417 | 6/1989 | Uchiyama et al. | 222/198 |
| 5,341,638 | 8/1994 | Van Name et al. | 60/204 |
| 5,465,879 | 11/1995 | La et al. | 222/189.06 |
| 5,505,777 | 4/1996 | Clardella et al. | 222/196 |

FOREIGN PATENT DOCUMENTS

| | | | |
|---|---|---|---|
| 383550 | 1/1965 | Switzerland | 366/108 |

*Primary Examiner*—Tony G. Soohoo
*Attorney, Agent, or Firm*—Leonard A. Alkov; William C. Schubert; Leonard A. Alkov

[57] ABSTRACT

Epoxy dispensing apparatus and methods that prevent separation of epoxy resin and filler particles that make up an epoxy adhesive dispensed by the apparatus. The dispensing apparatus is in the form of a syringe having epoxy adhesive disposed therein. A vibrating mechanism is coupled to the body of the dispensing apparatus. A controller is connected to the vibrating mechanism that controls the amount of vibration imparted to the dispensing apparatus by the vibrating mechanism. The dispensing apparatus is periodically vibrated during dispensing of the epoxy adhesive to mix the epoxy resin and filler particles and homogenize the epoxy adhesive.

8 Claims, 1 Drawing Sheet

VIBRATING DISPENSER AND METHOD FOR DISPENSING FILLED EPOXY ADHESIVES

BACKGROUND

The present invention relates generally to methods and apparatus for dispensing epoxy adhesives, and more particularly, to apparatus and methods for preventing resin and filler particle separation in epoxy adhesives during dispensing operations.

In conventional practice, two part epoxy adhesives comprising resin and filler particles are mixed and then loaded into dispensers, such a syringes, for example. After the mixed epoxy is loaded into the dispensers, it is dispensed onto a workpiece. It has been found that the resin and filler particles can separate during use.

It has been found that conductive epoxy that has been nonuniformly mixed has inadvertently been dispensed onto substrates for adhesively attaching microelectronic circuits, such as integrated circuits, for example. Separation of the epoxy resin and silver particles often results in poor electrical, thermal, and mechanical performance characteristics of these microelectronic circuit.

There is no known mechanism for mixing epoxy in-situ during the dispensing process.

It would therefore be an advantage to have an apparatus and method that prevents separation of the resin and filler particles during use. Accordingly, it is an objective of the present invention to provide for dispensing apparatus and methods for preventing resin and filler particle separation during dispensing of epoxy adhesives.

SUMMARY OF THE INVENTION

To meet the above and other objectives, the present invention provides for dispensing apparatus having a vibrating mechanism that is used to prevent separation of resin and filler particles (such as silver particles) that make up epoxy adhesives and that are dispensed by the dispensing apparatus. The dispensing apparatus may be fabricated in the form of a syringe or similar dispensing device having a body that is filled with a mixture of epoxy resin and filler particles. The body has a tip or needle through which the mixed epoxy adhesive is dispensed. A vibrating mechanism is disposed around or attached to the body, such as is provided by an ultrasonic vibrating mechanism. The vibrating mechanism is coupled to a controller that controls the amount of vibration imparted to the dispensing apparatus by the vibrating mechanism.

During operation, the vibrating mechanism prevents epoxy resin and filler material from separating in the syringe during use. It mixes the material during the dispensing process to prevent separation that typically occurs during application.

The present invention preferably utilizes ultrasonic vibration applied periodically to the outside of the syringe to keep the epoxy resin and filler particles homogeneously mixed during the dispensing process. The apparatus and method permits ultrasonic energy to keep the epoxy mixed while the dispensing process is performed. The epoxy resin and filler particles need not be removed from the dispensing equipment to be repeatedly mixed, or replaced with new mixed epoxy materials.

The present invention keeps the epoxy material homogeneous during the dispensing process without having to remix or replace the material at frequent intervals. The present invention eliminates dispensed material that is nonuniformly mixed on a product, such as conductive epoxy which is dispensed onto substrates for the adhesive attachment of integrated circuits, for example. Use of the present invention eliminates separation of the epoxy resin and silver particles and therefore improves the electrical, thermal, and mechanical performance characteristics of microelectronic circuits that are bonded using the present invention.

The present invention may be used in producing electronic circuits such as multichip module circuits built using epoxy adhesives. The present invention produces a higher quality product with a higher reliability and better performance, which is derived from improved electrical conductivity, improved thermal dissipation, and improved shear strength of the integrated circuits that are bonded using the present invention.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
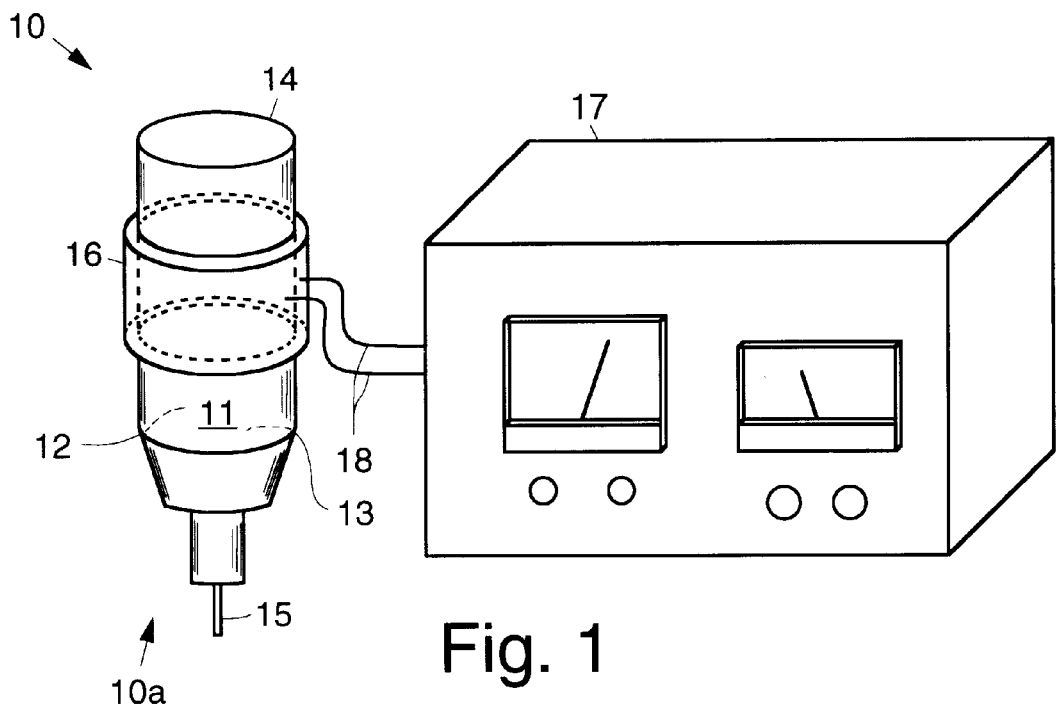
FIG. 1 illustrates dispensing apparatus in accordance with the principles of the present invention for preventing resin and filler particle separation in epoxy adhesives.
Figure 2:
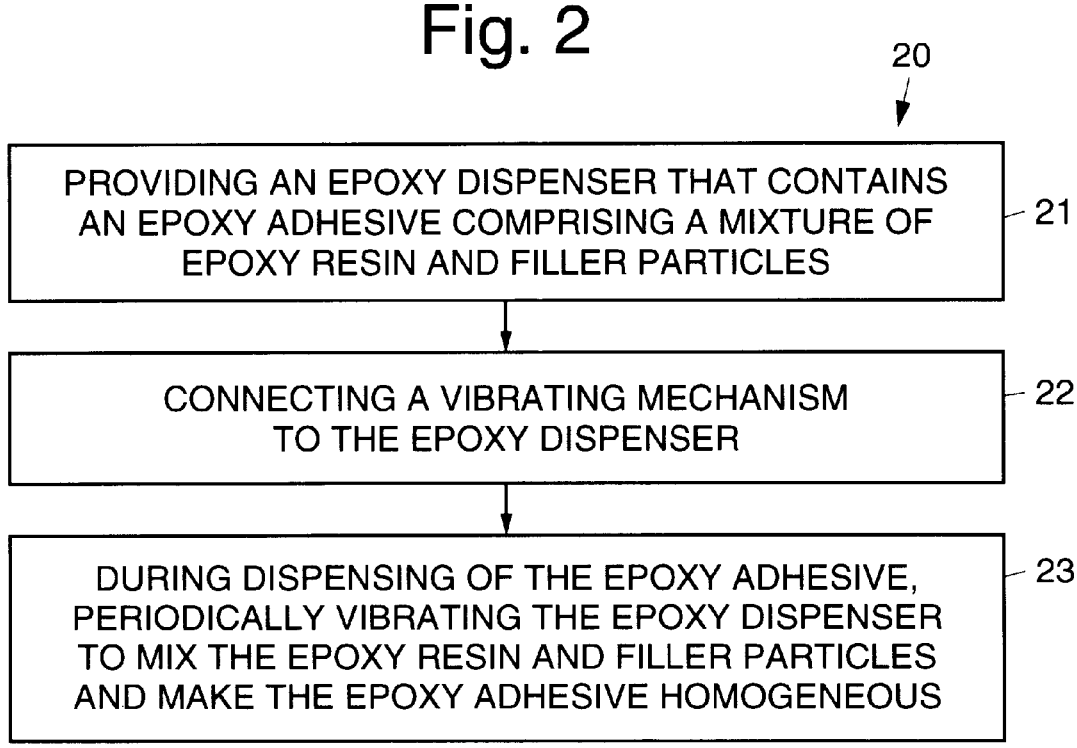
FIG. 2 illustrates one method of preventing resin and filler particle separation in epoxy adhesives in accordance with the principles of the present invention.

Referring to the drawing figures, FIG. 1 illustrates dispensing apparatus 10 (or epoxy dispenser 10) in accordance with the principles of the present invention for preventing separation of epoxy resin 12 and filler particles 13 (such as silver particles) that make up an epoxy adhesive 11 dispensed by the dispensing apparatus 10. The dispensing apparatus 10 has a body 14 or housing 14 that typically comprises a syringe 10a. The syringe 10a is filled with a mixture of the epoxy resin 12 and filler particles 13 or filler material 13 that forms the epoxy adhesive 11.

The syringe 10a has a tip 15 or needle 15 through which the mixed epoxy adhesive 11 is dispensed. In accordance with the present invention, a vibrating mechanism 16 is disposed around or attached to the syringe 10a, which may be provided by an ultrasonic vibrating mechanism 16. The vibrating mechanism 16 is coupled to a controller 17 that is electrically connected to the vibrating mechanism 16 by control wires 18. The controller 17 controls the amount of vibration imparted to the dispensing apparatus 10 by the vibrating mechanism 16.

During operation, the vibrating mechanism 16 coupled to the dispensing apparatus 10 prevents separation of epoxy resin 12 and filler particles 13 that make up epoxy adhesive 11 and that are dispensed by the dispensing apparatus 10. The vibrating mechanism 16 prevents epoxy resin 12 and filler material 13 from separating in the syringe 10a during use. The vibrating mechanism 16 mixes the epoxy resin 12 and filler material 13 during the dispensing process to prevent separation that typically occurs when the epoxy adhesive 11 is conventionally applied.

The dispensing apparatus 10 preferably utilizes ultrasonic vibration applied periodically to the syringe 10a to keep the epoxy resin 12 and filler particles 13 homogeneously mixed during the dispensing process. The dispensing apparatus 10 uses ultrasonic or other vibrational energy to keep the epoxy adhesive 11 mixed while the dispensing process is performed. Using the present invention, the epoxy resin 12 and filler particles 13 need not be repeatedly removed from the dispensing apparatus 10 to be mixed, or replaced with new mixed epoxy materials, which has been the case in conventional practice. Thus, the dispensing apparatus 10 keeps the epoxy material homogeneous during the dispensing process without having to remix or replace the epoxy resin 12 and filler particles 13 at frequent intervals.

The dispensing apparatus 10 may be advantageously used to dispense uniformly mixed conductive epoxy adhesive 11 onto substrates to provide for adhesive attachment of integrated circuits, for example. Use of the dispensing apparatus 10 eliminates separation of the epoxy resin 12 and silver particles 13 and improves the electrical, thermal. and mechanical performance and characteristics of microelectronic circuits that are bonded with conductive epoxy adhesive 11 dispensed with the dispensing apparatus 10.

The present invention may be advantageously used in producing electronic circuits such as multichip module circuits fabricated with epoxy adhesives 11. The present invention produces a higher quality product with a higher reliability and better performance, which is derived from improved electrical conductivity, improved thermal dissipation, and improved shear strength of the integrated circuits that are bonded using the present invention.

The present invention also provides for a method 20 of dispensing epoxy adhesive 11 comprising a mixture of epoxy resin 12 and filler particles 13. The method 20 comprises the following steps. The first step is to provide 21 a dispensing apparatus 10, or epoxy dispenser 10, that contains an epoxy adhesive 11 comprising a mixture of epoxy resin 12 and filler particles 13. The next step is to connect 22 a vibrating mechanism 16 to the epoxy dispenser 10. Then, during dispensing of the epoxy adhesive 11, the epoxy dispenser 10 is (periodically) vibrated 23 to mix the epoxy resin 12 and filler particles 13 and make the epoxy adhesive 11 homogeneous.

Thus, dispensing apparatus and methods for preventing resin and filler particle separation during dispensing of epoxy adhesives have been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. Epoxy dispensing apparatus comprising:
   a body having a tip through which epoxy adhesive is dispensed;
   an epoxy adhesive comprising a mixture of epoxy resin and filler articles disposed in the body; and
   vibrating means coupled to the body for vibrating the dispenser apparatus while the epoxy adhesive is dispensed, wherein said vibrating means comprises
      an ultrasonic vibrating mechanism coupled to the body, and
      a controller electrically connected to the vibrating mechanism for controlling the amount of vibration imparted to the dispensing apparatus by the vibrating mechanism.

2. The apparatus of claim 1 wherein the controller is caused to periodically vibrate the epoxy dispenser.

3. The apparatus of claim 1 wherein the epoxy adhesive comprises a conductive epoxy adhesive.

4. The apparatus of claim 1 wherein the filler particles comprise silver particles.

5. A method of dispensing an epoxy adhesive comprising the steps of:
   providing an epoxy dispenser that contains an epoxy adhesive comprising a mixture of epoxy resin and filler particles;
   connecting a vibrating mechanisms to the expoxy dispenser; and
   ultrasonically vibrating the epoxy dispenser during dispensing of the epoxy adhesive to mix the epoxy resin and filler particles and make the epoxy adhesive homogeneous.

6. The method of claim 5 wherein the step of vibrating the epoxy dispenser comprises the step of:
   periodically vibrating the epoxy dispenser during dispensing of the epoxy adhesive to mix the epoxy resin and filler particles and make the epoxy adhesive homogeneous.

7. The method of claim 5 wherein the epoxy adhesive comprises a conductive epoxy adhesive.

8. The method of claim 5 wherein the filler particles comprise silver particles.

* * * * *